United States Patent [19]

Grime et al.

[11] Patent Number: 4,768,930
[45] Date of Patent: Sep. 6, 1988

[54] HOLD-DOWN MECHANISM FOR A PIVOTALLY-MOUNTED MOTOR ON AN AIR COMPRESSOR

[75] Inventors: Thomas E. Grime, Temperance, Mich.; Gary C. Kreutzer, Toledo, Ohio

[73] Assignee: The DeVilbiss Company, Toledo, Ohio

[21] Appl. No.: 831,770

[22] Filed: Feb. 21, 1986

Related U.S. Application Data

[63] Continuation-in-part of Ser. No. 571,045, Jan. 13, 1984.

[51] Int. Cl.⁴ .............................................. F04B 35/00
[52] U.S. Cl. .................................... 417/362; 417/363; 248/665; 474/109; 474/135
[58] Field of Search ............... 248/665; 417/362, 363, 417/410; 474/101, 109, 133, 135

[56] References Cited

U.S. PATENT DOCUMENTS

| 1,324,029 | 12/1919 | Bouche | 248/665 X |
| 1,942,834 | 1/1934 | Railley | 248/665 |
| 2,448,379 | 8/1948 | Mantle | 417/362 X |
| 2,559,980 | 7/1951 | McAllister | 417/569 |
| 2,911,700 | 11/1959 | Wieland | 248/665 X |
| 4,242,055 | 12/1980 | Felter | 417/362 |
| 4,518,373 | 5/1985 | Roth | 474/109 |

FOREIGN PATENT DOCUMENTS

| 131688 | 7/1901 | Fed. Rep. of Germany | 248/665 |
| 650833 | 2/1929 | France | 248/665 |

Primary Examiner—Carlton R. Croyle
Assistant Examiner—T. Olds
Attorney, Agent, or Firm—MacMillan, Sobanski & Todd

[57] ABSTRACT

The invention is directed to a ratchet or hold-down mechanism for a motor which is pivotally connected to a base of a compressor attached to an air receiving tank. The compressor is provided with a base having a pair of legs at one end which terminate at resilient pads resting on the tank. The motor is attached to the compressor base adjacent the legs for limited pivotal movement toward and away from the compressor. A ratchet or hold-down mechanism is provided between the motor and the compressor base to restrict pivotal movement of the motor toward the compressor while allowing the motor to pivot away from the compressor to increase the tension on a belt connected therebetween. The ratchet mechanism maintains tension on the belt in the event that the portable air compressor is picked up by the motor or is accidently tipped on its side. In addition, the ratchet mechanism maintains a minimum tension on the belt during operation of the motor.

12 Claims, 6 Drawing Sheets

HOLD-DOWN MECHANISM FOR A PIVOTALLY-MOUNTED MOTOR ON AN AIR COMPRESSOR

CROSS REFERENCE TO RELATED APPLICATION

This application is a continuation-in-part of co-pending application Ser. No. 571,045, filed Jan. 13, 1984, and assigned to the assignee of the present application.

BACKGROUND OF THE INVENTION

1. Field Of The Invention

This invention relates to an improved mounting for a compressor and drive motor on an air receiving tank and more particularly to a ratchet or hold-down mechanism for a motor which is pivotally attached to a base of the compressor.

2. Description Of The Prior Art

Portable and stationary air compressors are used for many applications, including operating pressure feed tanks, spray guns, caulking guns, air brushes, sand blasters, pneumatic tools, tire inflaters, etc. Air compressors for these applications generally comprise a cylindrical air receiving tank, a belt-driven compressor, and a motor. In prior art air compressors, a mounting platform typically is welded either to the upper side of a horizontally-oriented tank or to the top of a vertically-oriented tank. The compressor and the motor are mounted on the platform, and a drive belt is provided to interconnect pulleys on the rotor and the compressor. The motor generally is bolted through slots in the mounting platform, which allows for adjustment of the motor position toward and away from the compressor to adjust belt tension. Since the air receiving tank must withstand a high internal gas pressure, highly skilled welders are required for welding the mounting platform onto the tank to avoid weakening the tank at the welds. Also, in this prior art construction, tension on the drive belt applies bending forces to the mounting platform which, in turn, stress the tank at the welds. These stresses fluctuate with changes in the compressor load, since both the motor and the compressor are rigidly bolted to separate locations on the mounting platform.

In a typical prior art air compressor, the pulley mounted on the compressor is of a considerably larger diameter than the pulley on the motor so that the compressor is driven at a much lower speed than the motor. In order to prevent belt slippage when the motor and the compressor are both rigidly attached to the mounting platform, a substantial spacing is required between the motor and the compressor to provide sufficient wrap of the belt around the small motor pulley.

SUMMARY OF THE INVENTION

The invention is directed to a ratchet or hold-down mechanism for a motor which is pivotally connected to a base of a compressor attached to an air receiving tank. The compressor is provided with a base having a pair of legs at one end which terminate at resilient pads resting on the tank. The motor is attached to the compressor base adjacent the legs for limited pivotal movement toward and away from the compressor. A ratchet or hold-down mechanism is provided between the motor and the compressor base to restrict pivotal movement of the motor toward the compressor while allowing the motor to pivot away from the compressor to increase the tension on a belt connected therebetween. The ratchet mechanism maintains tension on the belt in the event that the portable air compressor is picked up by the motor or is accidently tipped on its side. In addition, the ratchet mechanism maintains a minimum tension on the belt during operation of the motor.

DETAILED DESCRIPTION OF THE PREFERRED EMBODIMENTS

Figure 1:
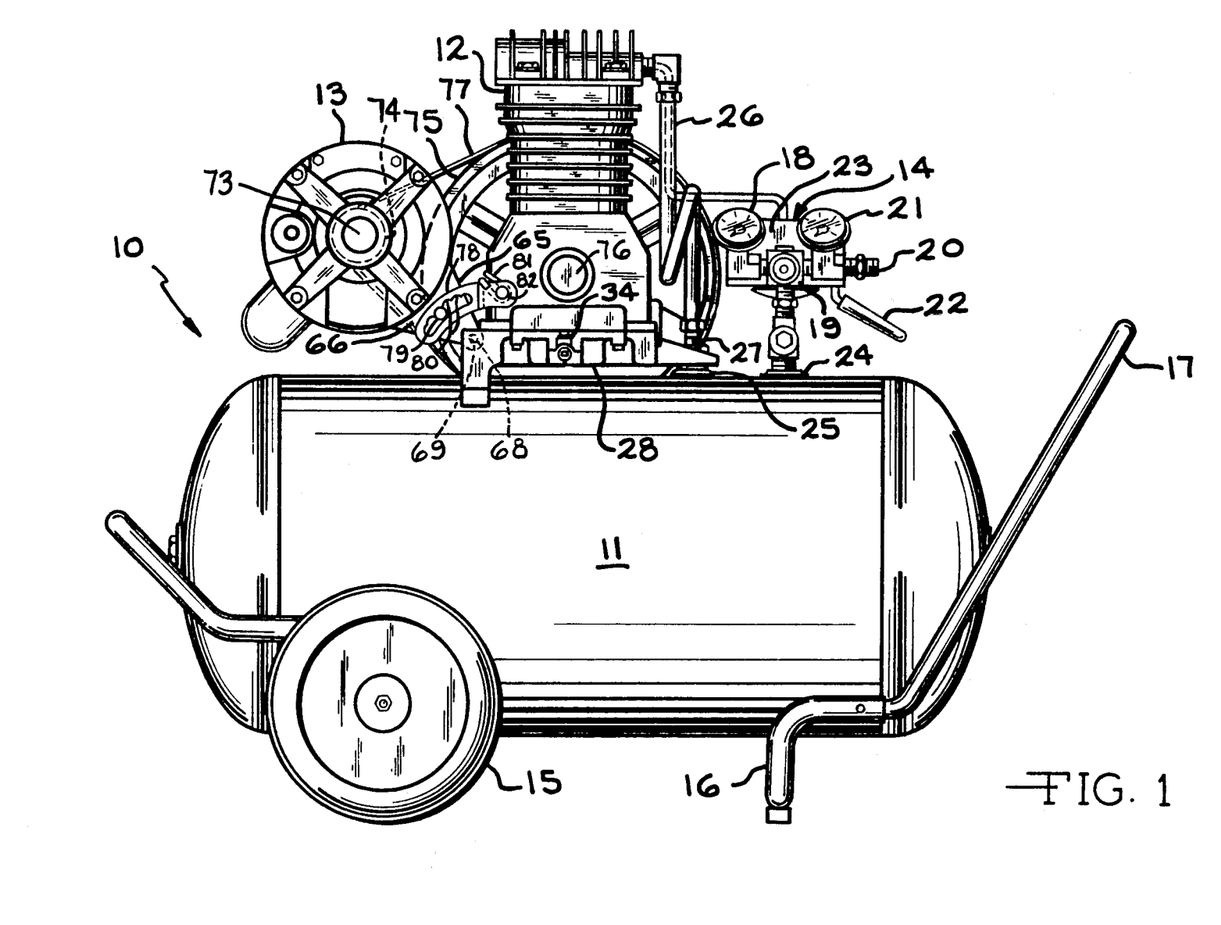
FIG. 1 is a front side elevational view of a portable air compressor illustrating a compressor and a motor mounted on an air receiving tank in accordance with a first embodiment of the present invention.
Figure 2:
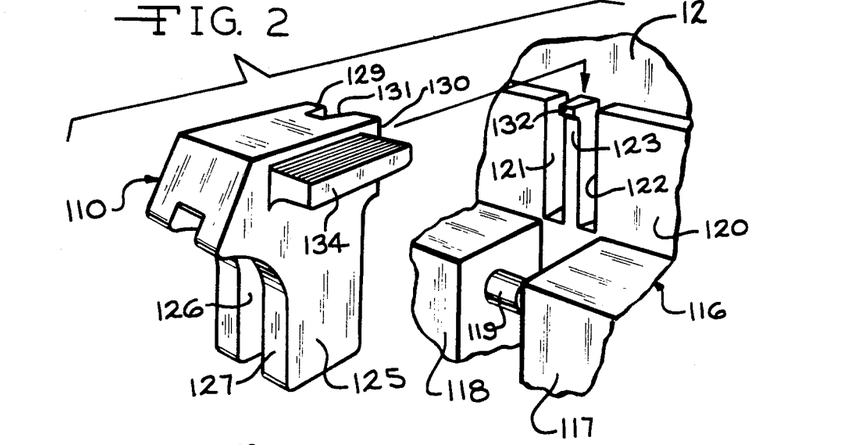
FIG. 2 is a fragmentary exploded perspective view of a ratchet mechanism for restricting rotation of the motor relative to the compressor in accordance with a second embodiment of the present invention.
Figure 3:
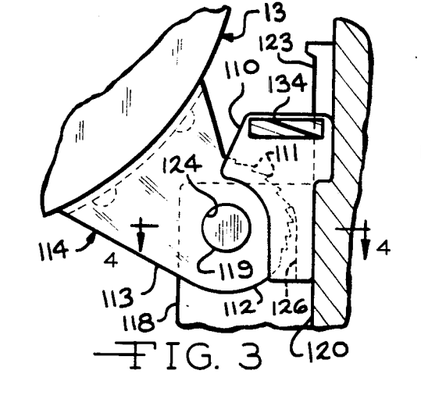
FIG. 3 is a cross sectional view taken along line 3—3 of FIG. 4 showing the ratchet mechanism of FIG. 2.
Figure 4:
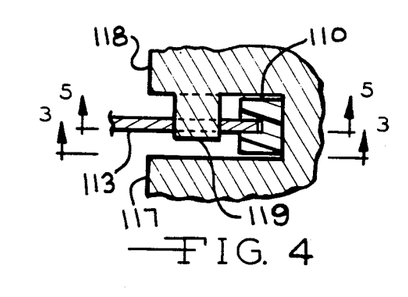
FIG. 4 is a cross sectional view taken along line 4—4 of FIG. 3 showing the ratchet mechanism of FIG. 2.
Figure 5:
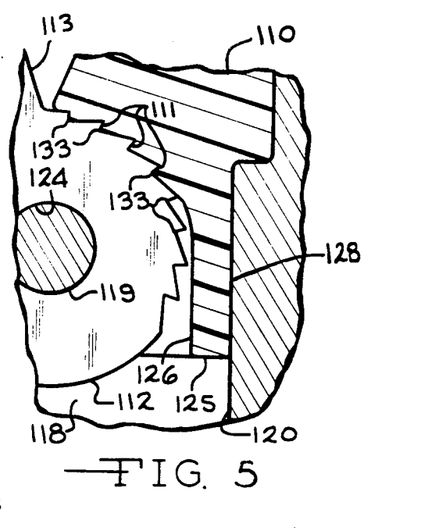
FIG. 5 is a cross sectional view taken along line 5—5 of FIG. 4 showing the ratchet mechanism of FIG. 2.

Turning now to the drawings and particularly to FIG. 1, a portable air compressor 10 is illustrated in accordance with a first embodiment of the present invention. The air compressor 10 includes an air receiving tank 11, a compressor 12, a motor 13, and controls 14. The illustrated tank 11 is supported at one end by a pair of wheels 15 (only one is illustrated) and at an opposite end by a tubular leg 16. A handle 17 is attached to the leg 16 to facilitate moving the portable air compressor 10. Reference number 14 generally refers to a plurality of conventional air compressor 'controls', which may include any one or more of the following: a gauge 18 for indicating the pressure within the air receiving tank 11; a pressure regulator 19 for controlling the pressure at a compressed air outlet 20; a gauge 21 for indicating the gas pressure at the outlet 20; an outlet valve 22; and a pressure responsive switch 23 for turning the motor 13 on and off. The controls 14 are attached to a first threaded flange 24 which is welded to an outlet opening (not shown) in the air receiving tank 11.

A second threaded flange 25 is welded to an inlet opening (not shown) of the tank 11. The compressor 12 supplies compressed air to the tank 11 through a tube 26 and an adapter 27 which threadably engages the flange 25. Preferably, the adaptor 27 includes a check valve (not shown) which allows unloading the outlet from the compressor 12 without loss of pressure within the tank 11. The outlet pressure on the compressor 12 is unloaded when the compressor 12 stops to facilitate restarting of the motor 13. The adaptor 27 also functions as an attachment point for connecting a base 28 to the tank 11, which supports the compressor 12 and the motor 13. The details concerning the structure of the base 28 and the means for attaching the base 28 to the air receiving tank 11 are described in the above-referenced patent application, the disclosure of which is hereby incorporated by reference.

A bracket 65 is bolted or otherwise attached to the motor 13. The bracket 65 is provided with two spaced, parallel arms 66 (only one is illustrated), each of which defines an opening 68 for receiving respective pins 69 (only one is illustrated) formed on the base 28. The arms 66 are spaced to receive the pins 69 so as to pivotally attach the motor 13 to the base 28, as discussed in the above-referenced patent application. After the bracket 65 is positioned on the pins 69, a clip (not shown) may be inserted through an opening (not shown) in one of the pins 69 to retain the motor 13 on the base 28 while allowing the motor 13 to pivot about an axis defined by the pins 69. The motor 13 includes an output shaft 73 on which a small diameter pulley 74 is mounted. A considerably larger diameter pulley 75 is mounted on an input shaft 76 on the compressor 12. A belt 77 interconnects the pulleys 74 and 75.

A ratchet 78 and pin 79 mechanism is shown for restricting pivotal movement of the motor 13 relative to the compressor 12. The ratchet 78 includes a plurality of inclined teeth 80 into which the pin 79, secured to the bracket arm 66, may move as the motor 13 is pivoted away from the compressor 12. A spring 81 is provided for pivoting the ratchet 78 about a pivot pin 82 attached to the base 28 to maintain the pin 79 within the spacing between the teeth 80. The ratchet 78 and the pin 79 function to prevent the motor 13 from pivoting toward the compressor 12 in the event that an operator attempts to use the motor 13 as a handle for picking up the portable air compressor 10 or in the event that the portable air compressor 10 is accidentally tipped on its side. As a consequence, tension on the belt 77 cannot be accidentally removed to allow the belt 77 to fall from the pulleys 74 and 75. The ratchet 78 and pin 79 also maintains a minimum belt tension which is greater than that achieved through the weight of the motor 13. Normally, maximum motor torque occurs when the motor is first started. At this time, the motor 13 pivots or dips slightly to increase the belt tension. At the same time, the pin 79 will engage a different tooth 80 on the ratchet 78. When the motor torque is reduced after the start-up period, the pin 79 will remain in this new ratchet tooth 80 to maintain a minimum belt tension which is not dependent on motor weight, belt length, etc.

Turning now to FIGS. 2 through 5, a second embodiment of the present invention is illustrated, wherein a modified ratchet mechanism is shown as including a shoe 110 which engages teeth 111 formed on a circular edge 112 on an arm 113 of a bracket 114 which is attached to the motor 13. A motor and compressor mounting base 116 includes a leg 117, a flange 118, and a pin 119, which are similar to the leg 35, the flange 47, and the pin 48 on the base 28 of FIG. 3 of the above-referenced patent application. The base 116 also includes a generally vertical sidewall 120. Two spaced, parallel grooves 121 and 122 are formed within the sidewall 120 to define a guide 123 located between and above the leg 117 and the flange 118.

In attaching the motor 13 to the base 116, the bracket 114 is positioned so that the pin 119 extends through an opening 124 formed in the bracket arm 113 which is concentric with the circular edge 112. The shoe 110 has a lower end 125 which fits between the pin 119 and the base wall 120 and substantially fills the width of the space between the leg 117 and the flange 118. A groove 126 is formed within a side 127 of the shoe 110 to extend upwardly from the lower end 125. The groove 126 is adapted to receive and capture the bracket arm 113 to retain the bracket arm 113 on the pin 119.

The shoe 110 has a side 128 which abuts the base wall 120. Two guides 129 and 130 project from an upper portion of the side 128 for engaging the base grooves 121 and 122, respectively. The guide 123 on the base 116 fits within a groove 131 which extends on the shoe 110 between the shoe guides 129 and 130. Accordingly, the grooves 121 and 122 and the guide 123 on the base 116 and the mating guides 129 and 130 and groove 131 on the shoe 110 confine the shoe 110 to vertical movement along the base wall 120. A stop 132 formed on the top of the guide 123 retains the shoe 110 on the base 116.

A series of teeth 133 are formed on the shoe 110 within an upper portion of the groove 126 for engaging the teeth 111 formed on the motor bracket arm 113. The teeth 133 on the shoe 110 cooperate with the teeth 111 on the motor bracket arm 113 for allowing the motor 13 to pivot away from the compressor 12 mounted on the base 116, or in a counter-clockwise direction as viewed in FIGS. 3 and 5. As the motor 13 is pivoted, the teeth 111 will rotate and engage different teeth 133 on the shoe 110 until the belt (not shown) interconnecting the motor 13 and the compressor 12 on the base 116 is tight. As different pairs of teeth 111 and 133 step into engagement, the shoe 110 will rise and fall through gravity to maintain the pairs of teeth 111 and 133 in contact. Once the belt is tightened, the teeth 111 and 133 cooperate to prevent a reverse clockwise movement of the motor 13 and consequently release the tension on the belt. When it is necessary to release tension on the belt, an operator simply lifts the shoe 110 by means of a knob 134 and pivots the motor 13 in a clockwise direction, as viewed in FIGS. 3 and 5. Accordingly, it will be seen that the shoe 110 replaces the clip discussed above, which retains the motor bracket 65 on the pins 69, and the ratchet mechanism of FIG. 1, which restricts pivotal movement of the motor 13.

Figure 6:
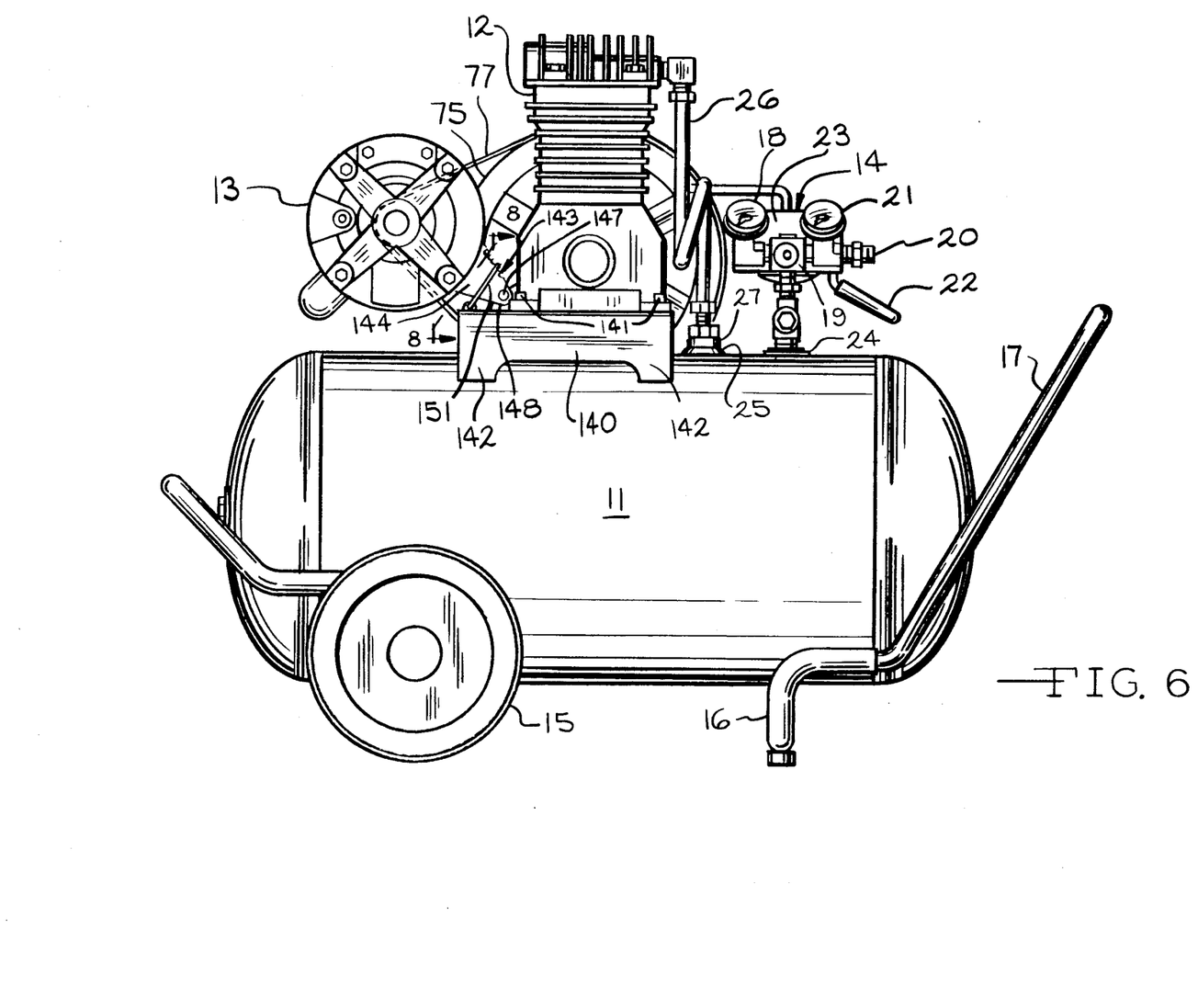
FIG. 6 is a front side elevational view of a portable air compressor illustrating a compressor and a motor mounted on an air receiving tank in accordance with a third embodiment of the present invention.
Figure 7:
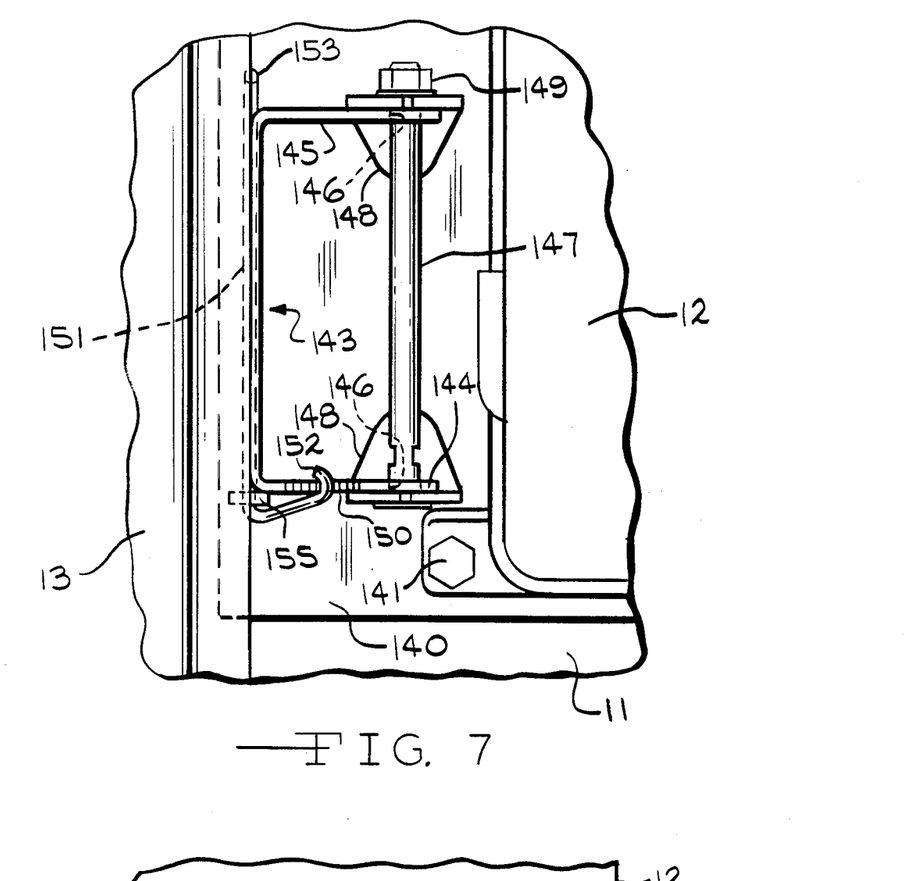
FIG. 7 is a fragmentary top plan view of the portable air compressor of FIG. 6.
Figure 8:
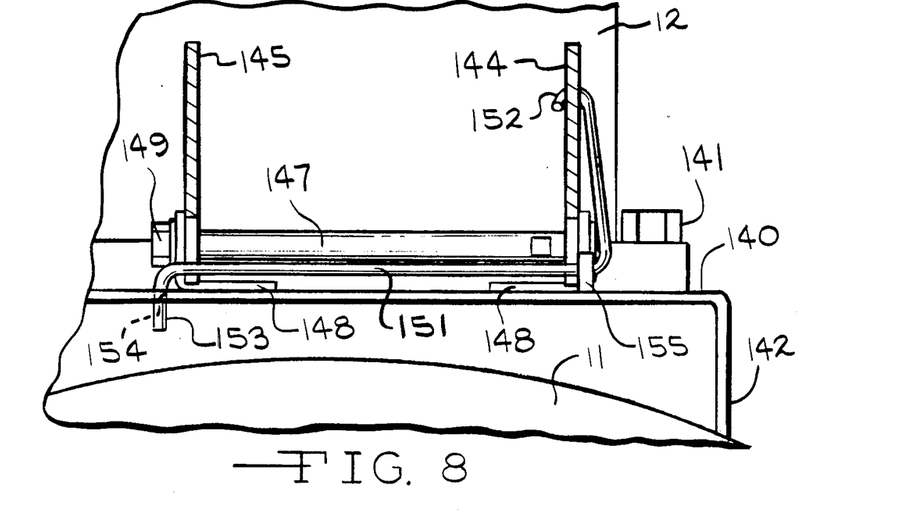
FIG. 8 is a fragmentary cross sectional view taken along line 8—8 of FIG. 6.

Turning now to FIGS. 6 through 8, a third embodiment of the present invention is illustrated, wherein yet another modified ratchet mechanism is provided for restricting pivotal movement of the motor 13 relative to the compressor 12. A base 140 is provided upon which the compressor 12 is secured by means of bolts 141 or other means. The base 140 includes a plurality of legs 142 for engaging the upper surface of the air receiving tank 11. A mounting bracket 143 is bolted or otherwise attached to the motor 13. The bracket 143 is provided with two spaced, parallel arms 144 and 145, each of which defines an opening 146 for receiving a pivot shaft 147 therein. The pivot shaft 147 is journalled at either end outwardly of the bracket arms 144 and 145 in respective support members 148 secured, such as by welding or other means, to the base 140. A bolt 149 can be provided to releasably maintain the pivot shaft 147 journalled within the bracket arms 144 and 145. The bracket arm 144 includes a plurality of inclined teeth 150 formed on the upper surface thereof.

A wire member 151 is connected between the base 140 and the inclined teeth 150 of the bracket arm 144 so as to restrict pivotal movement of the bracket 143 and the motor 13, similar to a ratchet and pawl mechanism. The wire member 151 is provided with a hooked end 152 which is adapted to engage the inclined teeth 150 formed on the bracket arm 144. An opposite tail end 153 of the wire member 151 is provided with a bend so as to extend downwardly through an aperture 154 formed in the base 140. A pivot housing 155 is attached to the base 140. The pivot housing 155 includes an aperture through which the wire member 151 extends. The pivot housing 155 provides a pivot point for the wire member and also prevents undesired flexing thereof. The wire member 151 is shaped such that it is subjected to torsional stress when disposed as illustrated in FIGS. 6 through 8. As a result of such torsional stress, the hooked end 152 of the wire member 151 is urged downwardly into engagement with the inclined teeth 150 formed on the upper surface of the bracket arm 144. In other words, the wire member is formed as a unitary member with the spring 81 and is subject to torsional stress during use. In this regard, the wire member 151 itself performs the function of the spring 81 illustrated in FIG. 1, namely, to normally maintain the hooked end portion 152 in contact with one of the inclined teeth 150. The wire member 151 can be manually pulled out of engagement with the inclined teeth 150 when it is desired to pivot the motor 13 toward the compressor 12. Otherwise, the operation of the unit with regard to the pivoting action of the motor 13 is substantially the same.

Figure 9:
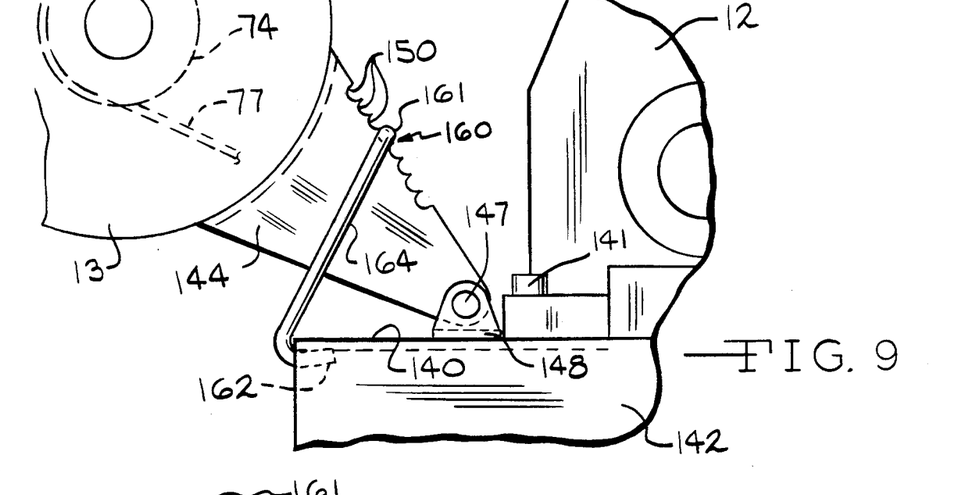
FIG. 9 is a fragmentary front side elevational view illustrating a ratchet mechanism for restricting rotation of the motor relative to the compressor in accordance with a fourth embodiment of the present invention.
Figures 10, 11, 12:
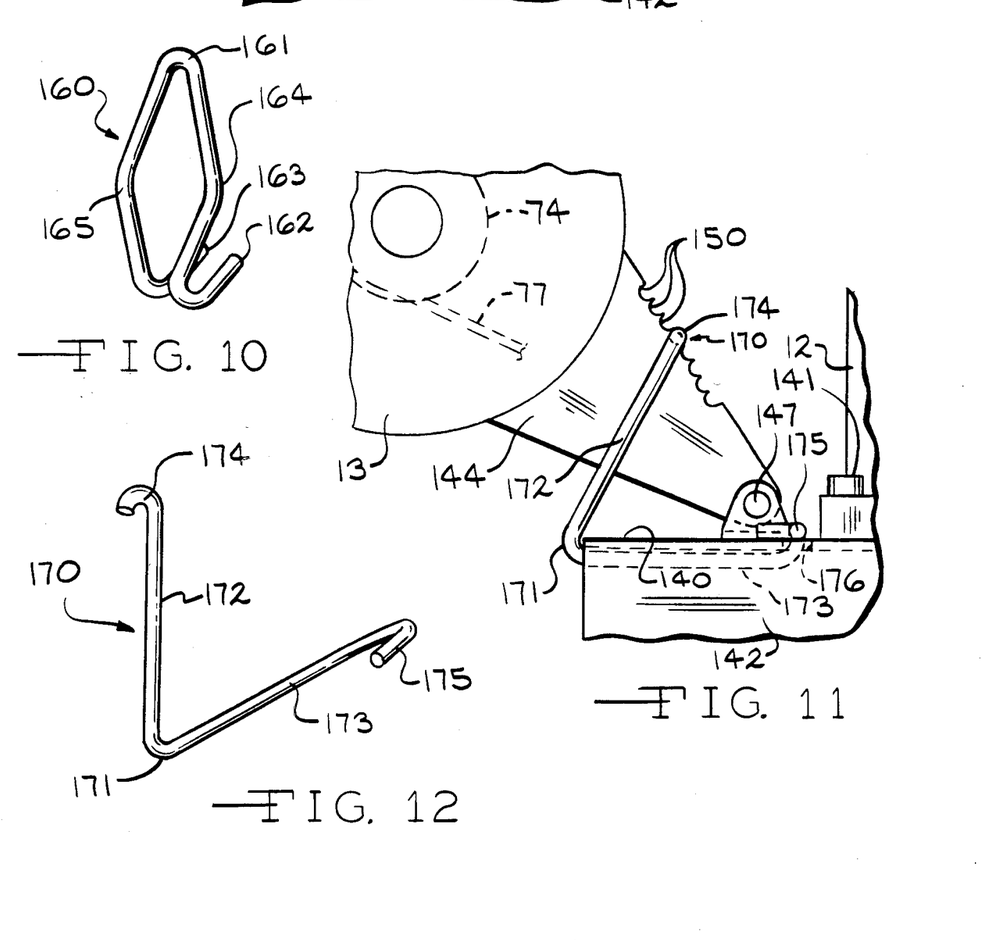
FIG. 10 is a perspective view of the wire member illustrated in FIG. 9.
FIG. 11 is a fragmentary front side elevational view illustrating a ratchet mechanism for restricting rotation of the motor relative to the compressor in accordance with a fifth embodiment of the present invention.
FIG. 12 is a perspective view of the wire member illustrated in FIG. 11.

Turning now to FIGS. 9 and 10, a fourth embodiment of the present invention is illustrated as comprising a structure similar to that described above in connection with FIGS. 6 through 8, except that the wire member 151 has been replaced with a modified wire member 160. The wire member 160 includes a central U-shaped portion 161, which is adapted to engage the inclined teeth 150 formed on the bracket arm 144, and a pair of curved end portions 162 and 163. Between the U-shaped central portion 161 and the end portions 162 and 163, respective bends 164 and 165 are formed in the wire member 160. The curved end portions 162 and 163 are adapted to hook beneath the upper surface of the base 140, as illustrated in FIG. 9. When so installed, the bends 164 and 165 are stressed out of their formed shape illustrated in FIG. 10 into an almost straight condition. As a result, the U-shaped portion 161 is urged downwardly into engagement with the inclined teeth 150 formed on the bracket arm 144. Accordingly, the motor 13 is permitted to pivot away from the compressor 12 and prevented from pivoting toward the compressor 12. As with the wire member 151 discussed above, the wire member 160 performs the function of the spring 81 illustrated in FIG. 1, and the operation of the unit with regard to the pivoting action of the motor 13 is substantially the same.

Turning now to FIGS. 11 and 12, a fifth embodiment of the present invention is illustrated similar to the embodiment illustrated in FIGS. 6 through 8, except that the wire member 151 has been replaced by still another modified wire member 170. The wire member 170 is connected between the base 140 and the inclined teeth 150 of the bracket arm 144 so as to restrict pivotal movement of the bracket 143 and the motor 13, similar to a ratchet and pawl mechanism. The wire member 170 is provided with a central bend 171 from which a pair of straight arm portions 172 and 173 extend outwardly therefrom. The arm portions 172 and 173 terminate in respective curved end portions 174 and 175. As shown in FIG. 11, the one curved end portion 174 is adapted to engage the inclined teeth 150 formed on the bracket arm 144. The other curved end portion 175 is adapted to extend upwardly through an aperture 176 formed in the upper surface of the base 140 so as to secure the wire member 170 thereto. The central bend 171 provides a measure of resiliency to the wire member, similar to the bends 164 and 165 discussed above in connection with FIGS. 9 and 10, so as to normally urge the one curved end portion 174 downwardly into engagement with the inclined teeth 150. The operation of the unit with regard to the pivoting action of the motor 13 is substantially the same as discussed in connection therewith.

Figure 13:
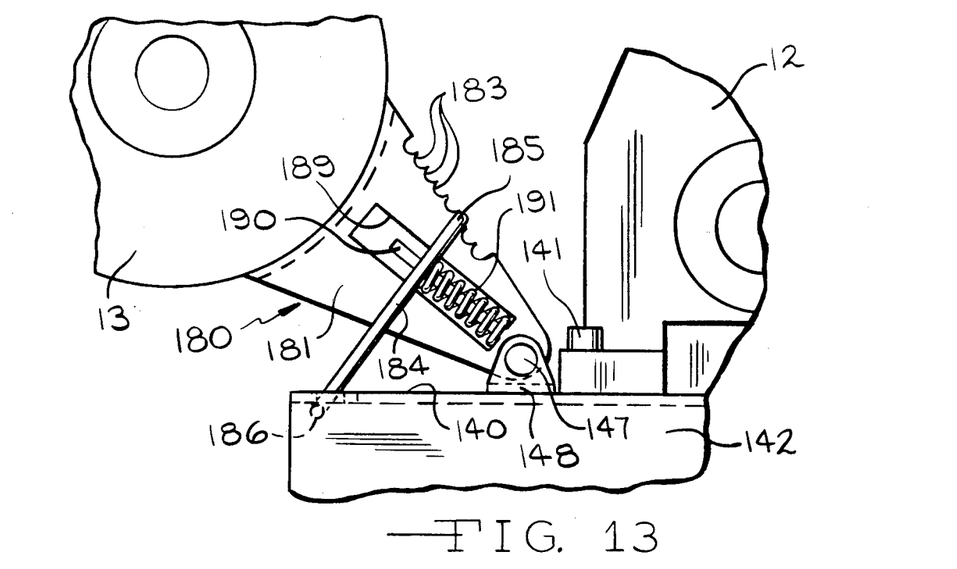
FIG. 13 is a fragmentary front side elevational view illustrating a ratchet mechanism for restricting rotation of the motor relative to the compressor in accordance with a sixth embodiment of the present invention.
Figure 14:
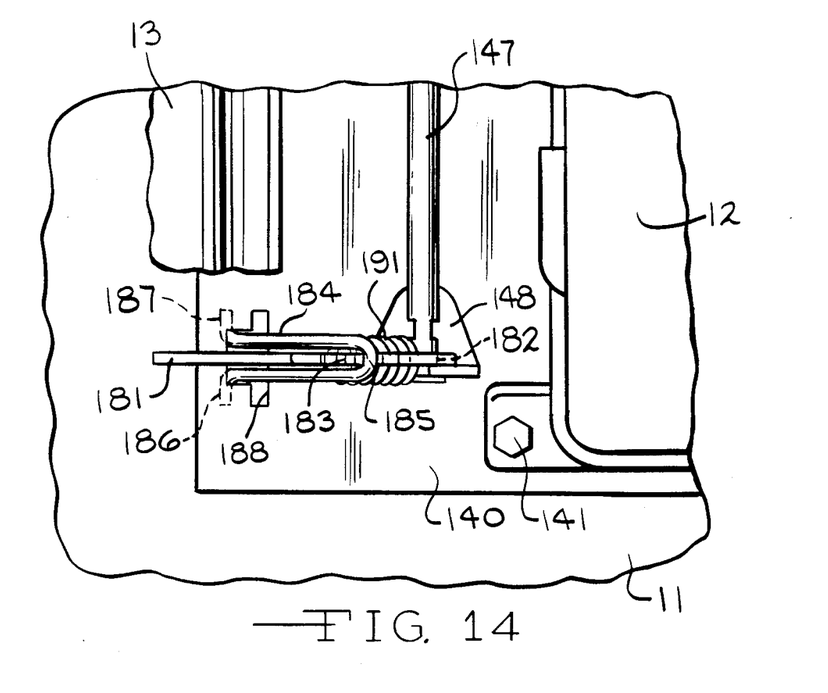
FIG. 14 is a fragmentary top plan view illustrating the ratchet mechanism of FIG. 13.

Turning now to FIGS. 13 and 14, a sixth embodiment of the present invention is illustrated as comprising yet another modified ratchet mechanism. The base 140, together with its legs 142, and the bolts 141 can be provided substantially as described above. A bracket 180 is bolted or otherwise attached to the motor 13. The bracket 180 is provided with two spaced, parallel arms 181 (only one is illustrated), each of which defines an opening 182 for receiving the pivot shaft 147 therein. The pivot shaft 147 is journalled at either end outwardly of the bracket arms 181 in the respective support members 148 secured to the base 140. The illustrated bracket arm 181 includes a plurality of inclined teeth 183 formed on the upper edge thereof. A wire member 184 is connected between the base 140 and the inclined teeth 183 of the bracket arm 181 so as to restrict pivotal movement of the bracket 180 and the motor 13, similar to a ratchet and pawl mechanism. The wire member 184 is provided with an elongated U-shaped body portion 185, which is adapted to engage the inclined teeth 183 formed on the bracket arm 181, connected to respective ends 186 and 187. The ends 186 and 187 of the wire member 184 are turned outwardly away from each other, as illustrated in FIG. 14. An aperture 188 formed in the base 140 is adapted to receive the ends 186 and 187 therethrough so as to permit pivoting motion of the wire member 184.

A rectangular slot 189 is formed in the bracket arm 181. Within the slot 189, a mounting member 190 is provided. As shown in FIG. 13, the mounting member 190 can be attached to the bracket arm 181 on the side of the slot 190 nearest to the pivot shaft 147 and, preferably, is formed integral with the bracket arm 181. A coil spring 191 is disposed coaxially about the mounting member 190 between the wire member 184 and the end of the slot 190 to which the mounting member 191 is connected. The spring 191 exerts a force against the wire member 184 so as to normally urge the U-shaped body portion 185 into engagement with the inclined teeth 183. In a manner similar to the prior embodiments discussed above, the pivoting movement of the bracket 180 and the motor 13 toward the compressor 12 will be restricted.

It will be understood that the method and apparatus described for mounting the motor on the base may be used for mounting a motor on a conventional compressor, pump or other load without attachment to an air receiving tank. The drawings illustrate the compressor driven by a standard electric motor. It will be appreciated that other types of motors may be used for driving the compressor, such as a conventional internal combustion engine. Such engines may be attached to the base in the same manner in which the motor is attached to the base. Other changes and modifications to the above described preferred modes will be apparent to those skilled in the art without departing from the spirit and scope of the following claims.

What is claimed is:

1. An apparatus for mounting a motor to drive a compressor through a drive belt connected therebetween comprising:
   a base secured to the compressor;
   a mounting bracket secured to the motor;
   means for pivotally connecting said mounting bracket to said base; and
   means for permitting the motor to pivot away from the compessor from any position relative to the compressor to a further position and for preventing the motor from pivoting toward the compressor from any position relative to the compressor to a closer position, said means for preventing including a plurality of teeth formed on said mounting bracket, a wire member pivotally connected to said base and adapted to cooperate with said teeth, and means for uging said wire member to pivot into cooperation with said teeth, whereby the tension on the drive belt may be maintained and increased but not decreased.

2. The invention defined in claim 1 wherein said means for preventing includes a ratchet and pawl mechanism.

3. The apparatus defined in claim 1 further including means for selectively releasing said means for preventing said motor from pivoting toward the comprssor to permit such pivoting toward the compressor.

4. The apparatus defined in claim 1 wherein said means for urging includes spring means for normally urging said wire member into engagement with said teeth so as to prevent the motor from pivoting toward the compressor.

5. The apparatus defined in claim 4 wherein said wire member and said spring means are formed as a unitary member subject to torsional stress during use.

6. The apparatus defined in claim 5 wherein said resilient wire member includes a first end adapted to be connected to said base, a second end adapted to engage said mounting bracket teeth, and an interior portion between said first and second ends adapted to resist said torsional stress caused by movement of said first end relative to said second end so as to normally urge said second end into engagement with said mounting bracket teeth.

7. The apparatus defined in claim 6 wherein said first end is adapted to extend through an aperture formed in said base so as to connect said resilient wire member thereto.

8. The apparatus defined in claim 6 wherein said resilient wire member includes a central bend formed therein connected by respective arm portions to said first and second ends.

9. The apparatus defined in claim 5 wherein said resilient wire member includes first and second ends adapted to be connected to said base and a central U-shaped portion adapted to engage said mounting bracket teeth.

10. The apparatus defined in claim 9 wherein said resilient wire member further includes respective bends formed between said U-shaped portion and each of said ends.

11. The apparatus defined in claim 4 wherein said mounting bracket includes a slot formed therein having a mounting member extending into said slot and said spring means includes a coil spring disposed about said mounting member.

12. An apparatus for mounting a motor to drive a compressor through a drive belt connected therebetween comprising:
    a base secured to the compressor;
    a mounting bracket secured to the motor;
    means for pivotally connecting said mounting bracket to said base for pivotal movement about an axis disposed between the compressor and the motor; and
    means for permitting the motor to pivot away from the compressor from any position relative to the compressor to a further position and for preventing the motor from pivoting toward the compressor from any position relative to the compressor to a closer position, said means for permitting including a plurality of teeth formed on said mounting bracket and a wire member pivotally connected to said base, said wire member being subjected to torsional stress during use so as to normally engage said plurality of teeth, whereby tension on the drive belt may be maintained and increased but not decreased.

* * * * *